Oct. 25, 1966

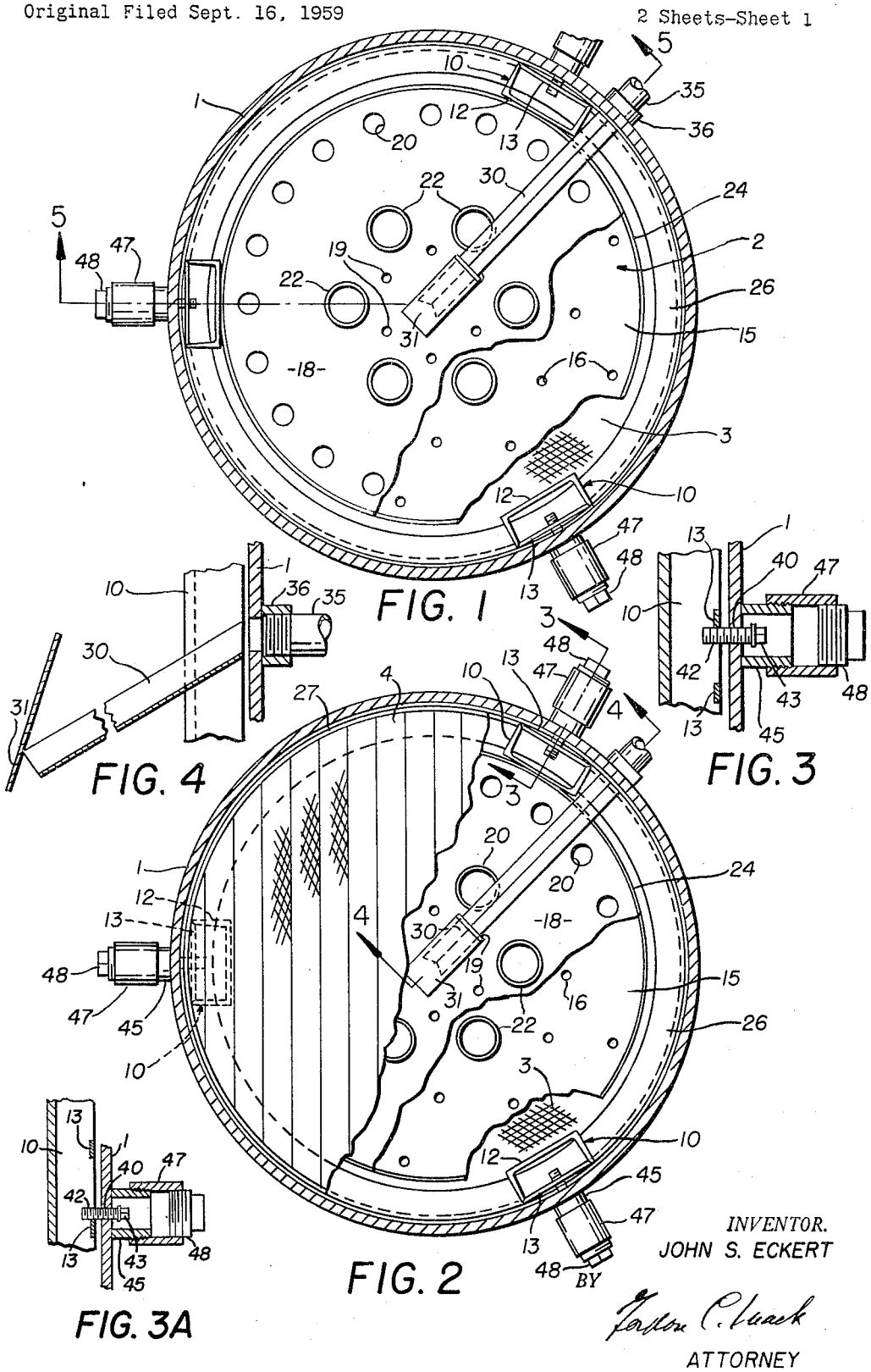

J. S. ECKERT 3,281,133

TREATING TOWER

Original Filed Sept. 16, 1959

INVENTOR.
JOHN S. ECKERT

BY *Gordon C. Mash*

ATTORNEY

United States Patent Office 3,281,133
Patented Oct. 25, 1966

3,281,133
TREATING TOWER
John S. Eckert, Silver Lake, Ohio, assignor to The United States Stoneware Company, Tallmadge, Ohio, a corporation of Ohio
Continuation of application Ser. No. 276,133, Apr. 25, 1963, which is a continuation of application Ser. No. 840,338, Sept. 16, 1959. This application Nov. 1, 1965, Ser. No. 516,186
12 Claims. (Cl. 261—97)

This application is a continuation of my application Serial No. 276,133 filed April 25, 1963 (now abandoned), which in turn is a continuation of my application Serial No. 840,338 filed September 16, 1959 (now abandoned).

This invention relates to improvements in a treating tower such as is used for bringing a gas and liquid into intimate contact so as to effect either a mass transfer or a heat transfer from one to the other. More particularly, the invention relates to an accessory unit for such a tower which includes at least two of the following components: (a) a hold-down plate, (b) a support plate, and (c) a distributor; the unit being capable of insertion in and removal from the tower; and it includes means for supporting such a unit in a tower. The treating tower is designed particularly for the absorption of gases in a solvent or the stripping of gases from a solvent or for use in distillation.

The invention will be further described in connection with the accompanying drawings which are illustrative. The tower there shown is illustrative. The shell need not be metal but may be made of concrete, etc. The hold-down plate may be of woven screen or expanded metal or of other suitable open construction. The support plate need not be composed of bent screening as shown, but also may be of expanded metal or other suitable open construction. The distributor is typical of the type of distributor which may be employed, and any other distributor construction can be utilized.

In the drawings:

FIGURE 1 is a section on the line 1—1 of FIGURE 5 showing a plan view of the top of the distributor, etc., the distributor being partly broken away to show its construction and the hold-down plate below it;

FIGURE 2 is a section on the line 2—2 of FIGURE 5 showing a plan view of the support plate, etc., the support plate being partly broken away to show the distributor which, in turn, is partly broken away to show its construction and to show the hold-down plate below it;

FIGURE 3 is a detailed section on the line 3—3 of FIGURE 2 through one of the supporting means which holds the unit shown in FIGURE 2; identical supporting means being used to hold the unit shown in FIGURE 1;

FIGURE 3A is similar to FIGURE 3 but shows the position of the distributor supporting means when the bed of packing elements below it is pre-loaded;

FIGURE 4 is a vertical section on an enlarged scale of the liquid supply means, on the line 4—4 of FIGURE 2.

Figure 5:
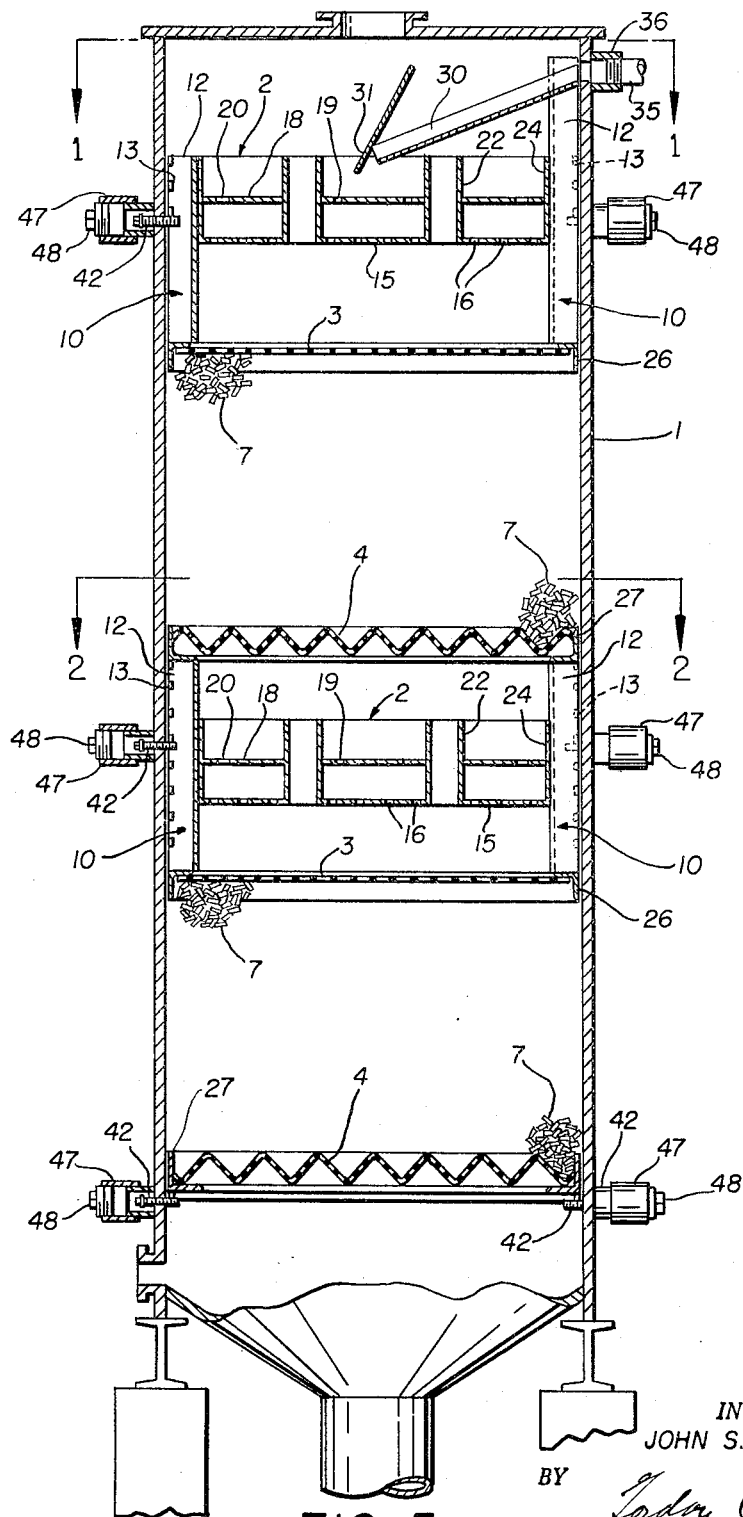
FIGURE 5 is a section of the tower on the line 5—5 of FIGURE 1.

The tower includes the shell 1. It is shown as embodying the unit of FIGURE 1 which includes the distributor 2 and hold-down plate 3. The distributor and hold-down plate are identical with those at the middle of the tower as a unit which also includes the support plate 4. This latter unit is shown in FIGURE 2. The tower may include two or more of the latter units (with or without a distributor), depending upon the number of beds of packing elements 7. FIGURE 5 shows two such beds. The bottom bed is supported by the separate plate 4 at the bottom of the tower which is shown as identical with the support plate of the unit shown at the middle of the tower and in FIGURE 2. It is to be understood that although the two distributors 2 shown in FIGURE 5 and the two hold-down plates 3 and the two support plates 4 shown in FIGURE 5 are shown as identical with one another, distributors, support plates and hold-down plates of different constructions may be employed in the same tower.

The different components of the several units shown in FIGURES 1 and 2 are held together by ladder supports 10 located at their periphery. The ladders, as more particularly shown in FIGURES 2 and 3, are each composed of a vertical channel 12 having straps or steps 13 (FIGURE 3) fastened at spaced intervals across its open face. The primary advantage of this ladder support is that the exact location of the unit within the tower may be varied without changing the location of the support means which project inwardly from the wall of the tower (and will be described in detail in what follows), the number of possible vertical locations of each unit depending upon the number of steps 13 in the ladders supporting it.

A simple form of distributor is shown, it being understood that other forms may be employed. The distributor includes the lower pan 15 in which there are many small openings 16 and the upper pan 18 in which there are also small openings 19 with larger openings 20 near the periphery. Pipes 22 are spaced at intervals around the center of the pans. The lower pans 15 are fastened to the bottom of these pipes and the upper pans 18 are fastened at about the midheight of the pipes. There is a wall 24 around the circumference of the distributor which forms sides for the pans so that they can collect a depth of liquid on them. The circular angle frame 26 which forms the support frame for the hold-down grid of plate 3 is welded to the ladder supports 10, holding them in spaced relation, and it unites the hold-down plate 3 to the ladder supports. The circular angle frames 27 shown at the middle of the tower (FIGURE 5) perform a like function with respect to the support plate 4, and the circular angle frame 27 at the bottom of the tower simply frames the support plate, there being no ladder supports at this location because they would serve no useful function.

The hold-down plates 3 are fastened to the angle plates 26 as shown in FIGURE 5, or are attached in any other suitable manner. In the units which include a support plate 4, these plates 4 rest on the upper angle plates 26 or are secured in any suitable fashion. It is to be understood that the distributor described is illustrative of the distributors that may be employed and distributors of very different construction may be utilized.

Liquid may be introduced into the top of the tower in any suitable manner. Introduction at intermediate levels above any one or more distributor plates located below the top of the tower are optional. The means shown for introducing liquid at such levels includes the trough 30 (shown in section in FIGURE 4) which functions at low liquid rates as a conductor for the liquid to the center of the distributor plate, and as a means for supporting baffle 31 which will deflect a liquid stream down on to the distributor plate when introduced at such higher rate that it does not flow down the trough. This trough 30 is welded to one of the ladder supports. Liquid is fed to the tower through the pipe 35 which is screwed into the coupling 36 which is welded to the outside of the wall 1. This makes a pressure-tight joint so that there is no leakage of gas or liquid at this point. Flanging or all-welded construction may also be used. Other liquid inlets in the intermediate section of the tower may be identical with this.

Liquid supplied through the trough 30 collects on the pan 19 and drains through the openings in it and collects on the pan 15 immediately below it, which further distributes the liquid prior to introducing it through the openings 16 into the mass of packing elements 7 below it. By allowing the liquid to collect to a slight depth on each of these pans it is blended to a uniform composition and distributed uniformly throughout the entire cross section of the tower.

The supports for the different units will be described in detail with reference to FIGURES 2 and 3, but it is to be understood that the description applies also to the support of the upper unit shown more particularly in FIGURE 1 and the non-detailed support plate 4 at the bottom of the tower. The wall 1 is provided with tapped openings 40 at three or more locations around the tower in the same plane. Three such openings are preferred. The units which include a distributor plate have ladder supports 10 of sufficient length to align the distributor plate in the tower so that the distributor pans 16 and 19 are held in a level position because the column itself is vertical. Lugs 42 with square or hexagonal, etc., heads 43 are threaded into these tapped openings. The openings are surrounded by the nipples 45 which are threaded externally, and these are covered by suitable gas-tight means to prevent leakage of gas. The means shown includes the couplings 47 threaded internally at both ends and the plugs 48 in the outer ends of these couplings. To support a unit, the lugs 42 are threaded into the wall a sufficient distance to enter the space between two ladder steps 13.

If it becomes desirable to change a bed of packing elements or remove a unit for any purpose whatsoever, this can be done by unscrewing the lugs 42 from the outside of the tower and lifting the unit from the tower. Conversely, after placing a unit in a tower, the lugs 42 can be screwed into position from the outside of the tower.

It will be obvious that with this construction the support for the units can be engaged or disengaged from the exterior of the tower. The unit is first lowered into the tower by a block and tackle or any suitable means, and when it is at the desired height, the lugs are threaded into the wall of the tower so that each is in a position to engage the next higher step 13 of the ladder when the unit is put in place. In the event of an upset condition in the tower which would lift the unit, the next lower ladder element 13 would limit the extent to which this could occur. It is to be understood that at the time that the tower is packed the beds are somewhat pre-loaded so that element 3 will normally contact the top of the packed bed 7 immediately below it with some degree of pressure. This is illustrated in FIGURE 3A.

Although the upper unit in FIGURE 5 is shown as not including a support plate, it may include a support plate with a shallow bed of packing elements resting on it to serve as a mist eliminator.

Instead of lowering a unit into contact with the support lugs, the hold-down plate may rest on the bed of packing elements below it and this may hold the ladder steps up out of engagement with the respective lugs. If the bed settles as by deterioration of the elements (e.g. if the elements are metal) the unit will become supported by the ladder, and will not settle further. But in installations where the bed of packing elements is compressed, the unit above the bed is pushed down into place and held there by lugs.

In certain installations, the lugs will be omitted and one or more units (with or without distributors) will rest directly on the one or more beds. Alternatively, the units can be welded to the tower wall instead of being supported by lugs.

The invention is covered by the claims which follow.

What I claim is:

1. A treating tower with inlet and outlet means for the introduction and withdrawal of gas and liquid for countercurrent flow therein, the wall of the tower being a shell the interior of which is of uniform, horizontal cross-sectional area throughout, upper and lower beds of discrete packing elements randomly arranged in the tower and each extending from wall to wall therein, and an integral unit between the beds which is adapted to be removed from the tower intact, which unit contains no packing elements but includes a perforated hold-down plate resting on the lower bed, a perforated support plate parallel to the hold-down plate and supporting the upper bed, the support plate being spaced above the hold-down plate, the perimeters of the support plate and hold-down plate being identical, and a distributor between the plates, which distributor includes means to confine liquid with provision for release of the same at a plurality of locations on the hold-down plate, the distributor being confined to the space between the plates, and means holding the hold-down plate, support plate and distributor together as a one-piece unit.

2. The integral unit of claim 1 for use in a tower as there described, which tower has outwardly removable means projecting inwardly from the wall thereof, which unit includes at spaced intervals at the periphery of the unit a series of means each of which means includes openings at different vertical levels for engagement by said means projecting inwardly from the wall of the tower.

3. A treating tower with inlet and outlet means for the introduction and withdrawal of gas and liquid for countercurrent flow therein, the wall of the tower being a shell the interior of which is of uniform, horizontal cross-sectional area throughout, upper and lower beds of discrete packing elements randomly arranged in the tower and each extending from wall to wall therein, and an integral unit between the beds which is adapted to be removed from the tower intact, which unit includes a perforated hold-down plate resting on the lower bed and a distributor to confine liquid with provision for release of the same at a plurality of locations on the hold-down plate, said distributor being disposed above said hold-down plate and being confined to the space immediately above the hold-down plate, with means holding the hold-down plate and the distributor together as a one-piece unit.

4. The integral unit of claim 3 for use in a tower with a confining wall, which tower has outwardly removable means projecting inwardly from the wall thereof, which unit includes at spaced intervals at the periphery of the unit a series of means each of which means includes openings at different vertical levels for engagement by said means projecting inwardly from the wall of the tower.

5. A treating tower with inlet and outlet means for the introduction and withdrawal of gas and liquid for countercurrent flow therein, the wall of the tower being a shell the interior of which is of uniform, horizontal cross-sectional area throughout, upper and lower beds of discrete packing elements randomly arranged in the tower and each extending from wall to wall therein, and an integral unit between the beds and resting on the lower bed which is adapted to be removed from the tower intact, which unit includes a perforated hold-down plate and a perforated support plate in spaced parallel relation with the bottom of the support plate facing the top of the hold-down plate, the perimeters of the support plate and hold-down plate being identical, with means holding the two plates together as a one-piece unit.

6. The integral unit of claim 5 for use in a tower as there described, which tower has outwardly removable means projecting inwardly from the wall thereof, which unit includes at spaced intervals at the periphery of the unit a series of means each of which means includes openings at different vertical levels for engagement by said means projecting inwardly from the wall of the tower.

7. A treating tower with inlet and outlet means for the introduction and withdrawal of gas and liquid for countercurrent flow therein, the wall of the tower being a shell the interior of which is of uniform, horizontal cross-sectional area throughout, at least two beds of discrete packing elements disposed one above the other within the shell and each extending from wall to wall therein and in contact with the shell, an integral unit which comprises a substantially horizontally perforated hold-down plate on the bottom and a substantially horizontal perforated support plate on the top with a distributor between them with the hold-down plate resting on the lower bed and the upper bed resting on the support plate, each of said plates being coextensive with the horizontal cross-sectional area of the tower, the distributor including means to confine liquid with provision for release of the same at a plurality of locations on the hold-down plate, at least three series of vertically spaced openings spaced laterally at the periphery of the unit, and at least three radially movable support means passing through the tower wall with the inner end of each engaged in one of said openings of one of said series, each of said movable support means being disengageable from its opening by outward movement, with means outside of the tower connected with said movable support means by which to effect such outward movement.

8. A treating tower with inlet and outlet means for the introduction and withdrawal of gas and liquid for countercurrent flow therein, the wall of the tower being a shell the interior of which is of uniform, horizontal cross-sectional area throughout, at least two beds of discrete packing elements disposed one above the other within the shell and each extending from wall to wall therein and in contact with the shell, an integral unit which comprises a substantially horizontal perforated hold-down plate on the bottom and a substantially horizontal perforated support plate on the top with the hold-down plate resting on the lower bed and the upper bed resting on the support plate, each of said plates being coextensive with the horizontal, cross-sectional area of the tower, at least three series of vertically spaced openings spaced laterally at the periphery of the unit, and at least three radially movable support means passing through the tower wall with the inner end of each engaged in one of said openings of one of said series, each of said movable support means being disengageable from its opening by outward movement, with means outside of the tower connected with said movable support means by which to effect such outward movement.

9. The tower of claim 8 in which the bottoms of said radially movable support means are in pressure contact with the bottoms of the respective openings whereby the bottom bed is compressed by the hold-down plate.

10. A treating tower with inlet and outlet means required for the introduction and withdrawal of gas and liquid for counterflow therein, a bed of discrete packing elements located in the tower and extending from wall to wall therein and in contact with the wall, an integral unit resting on the bed which unit comprises three elements, namely: a substantially horizontal perforated hold-down plate on the bottom, a distributor above the hold-down plate, the hold-down plate being coextensive with the horizontal cross-sectional area of the tower, the distributor including means to confine liquid with provision for release of the same at a plurality of locations on the hold-down plate, and a trough extending to the distributor from adjacent the tower wall but separate from the wall for supplying liquid to the distributor, a plurality of series of vertically spaced openings spaced laterally at the periphery of the unit, and an equal number of radially movable support means passing through the tower wall with the inner end of each engaged in one of said openings of one of said series, each of said movable support means being disengageable by outward movement with means outside of the tower connected with said movable support means by which to effect such outward movement, and a liquid-supply opening in the wall of the tower at that end of said trough which is adjacent the tower wall, said liquid supply means being fastened externally of the tower at said liquid-supply opening.

11. A vertical tower having a vertical retaining wall, said tower including a liquid inlet and gas outlet means at the top thereof and a gas inlet and liquid outlet at the bottom thereof, a support for packing elements, a bed of discrete packing elements on said support, a perforated hold-down plate in the tower located immediately above said bed, and removable means extending through the wall which holds the plate in contact with the top of said bed under a greater pressure than exerted by the weight of the plate when the tower is not in use.

12. A tower with inlet and outlet means required for the introduction and withdrawal of gas and liquid for counterflow therein, a bed of discrete packing elements arranged within the tower, a perforated hold-down plate on said bed, vertical ladder means at the edge of the hold-down plate, at least three radially movable support means passing through the tower wall with a bottom portion of that part of each of said support means within the wall being in pressure contact with an upper surface of a horizontal step of said ladder whereby the hold-down plate is in pressure contact with the bed.

References Cited by the Examiner

UNITED STATES PATENTS

| 735,693 | 8/1903 | Anderson | 261—2 |
| 2,888,091 | 5/1959 | Katz | 261—95 X |
| 2,979,314 | 4/1961 | Eckert | 261—94 |
| 3,121,618 | 2/1964 | Yerzley | 261—95 X |

FOREIGN PATENTS

| 8,958 of 1909 | 2/1910 | Great Britain. |

HARRY B. THORNTON, *Primary Examiner.*

T. R. MILES, *Examiner.*